United States Patent [19]
Winfield et al.

[11] 3,819,466
[45] June 25, 1974

[54] REINFORCED AND INSULATING BUILDING PANEL
[75] Inventors: Armand G. Winfield; Barbara L. Winfield, both of Lindenhurst, N.Y.
[73] Assignee: Care, Inc., New York, N.Y.
[22] Filed: June 18, 1973
[21] Appl. No.: 371,027

[52] U.S. Cl. ............... 161/89, 161/137, 52/618, 52/309
[51] Int. Cl. ...... B32b 5/02, B32b 27/12, E04c 2/32
[58] Field of Search.. 52/618; 161/DIG. 4, 133–137, 161/89; 156/205–208, 210

[56] References Cited
UNITED STATES PATENTS

| | | | |
|---|---|---|---|
| 1,236,829 | 8/1917 | Evans | 52/618 |
| 2,377,335 | 6/1945 | Finlayson et al. | 52/309 |
| 2,576,530 | 11/1951 | Medal | 52/618 |
| 2,671,158 | 3/1954 | Rubenstein | 52/309 |
| 2,836,529 | 5/1958 | Morris | 52/309 |
| 3,088,588 | 5/1963 | Feichter et al. | 52/173 |
| 3,697,365 | 10/1972 | Reisman et al. | 161/133 |

*Primary Examiner*—Frank L. Abbott
*Assistant Examiner*—James L. Ridgill, Jr.

[57] ABSTRACT

A double-walled reinforced and insulating building panel, having an inner skin constructed from a plurality of woven jute layers saturated in polyester resin, an outer skin constructed of a single base layer of woven jute with an exterior coating of chopped glass fibers saturated in resin and an intervening corrugated layer constructed of a plurality of woven jute layers and saturated in polyester resin and bonded between the inner and outer skin. The panel is characterized by its light weight and durability under extremes of temperature and wind, as well as the extreme economy of construction in using woven jute as the reinforcing element.

6 Claims, 16 Drawing Figures

PATENTED JUN25 1974 3,819,466

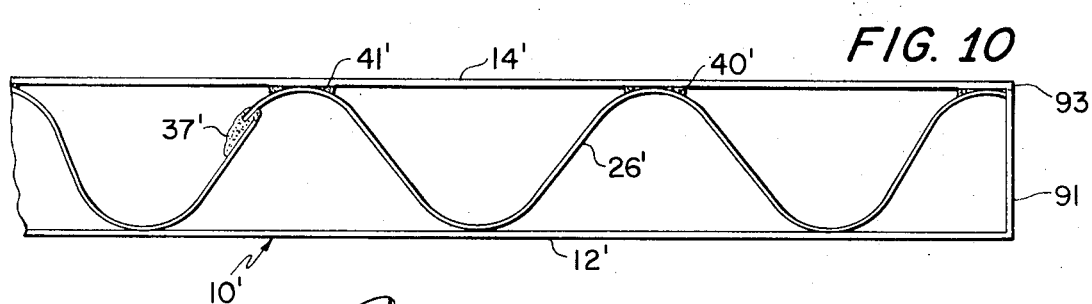
FIG. 10
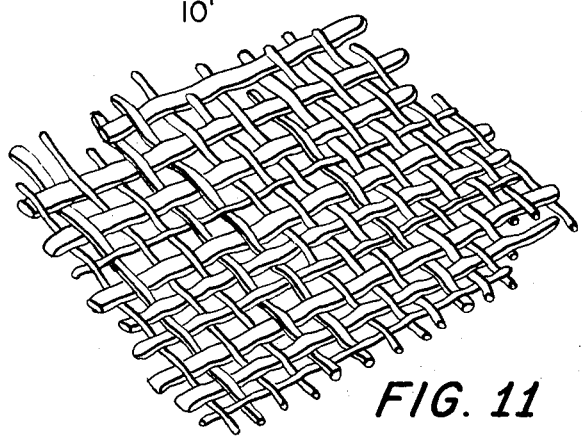
FIG. 11
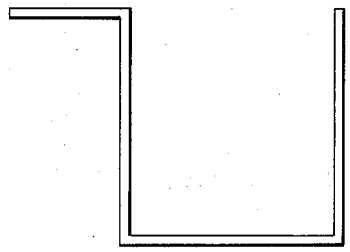
FIG. 14
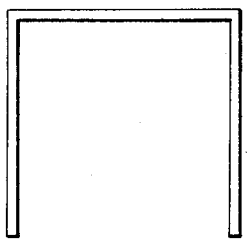
FIG. 12
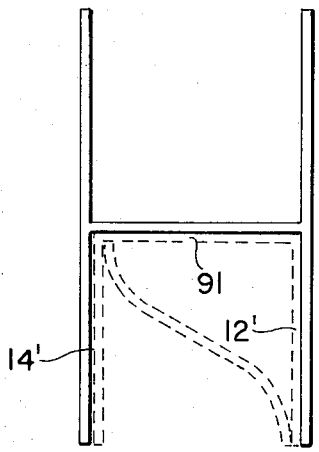
FIG. 13
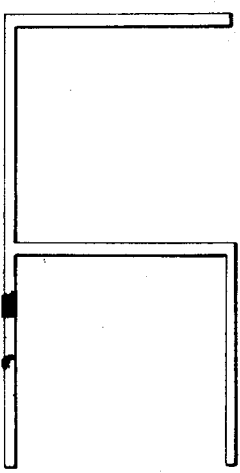
FIG. 15
FIG. 16

REINFORCED AND INSULATING BUILDING PANEL

BACKGROUND OF THE INVENTION

1. Field of the Invention

Modular panels of the type used in composite building structures. The panel was developed for CARE, Inc., in its effort to provide fast, safe and inexpensive housing systems in developing countries, especially Bangladesh where a major war for independence and a tidal wave have left incalculable devastation.

2. Description of the Prior Art

Prior art searching has developed the following:

| | |
|---|---|
| KIRSCHBRAUN | 1,765,796 |
| LONDON | 2,122,479 |
| REGER | 2,222,573 |
| SKOLNIK | 2,405,527 |
| SULLIVAN | 3,139,369 |
| NORMAN | 3,228,822 |
| BLANDY | 3,691,002 |
| FINGER | 2,984,950 |
| HUNGERFORD | 3,265,556 |

The patents to Kirschbraun, London, Reger, Skolnik, Sullivan and Norman show composite panels used in buildings, including in various combinations inner and outer layers and cores of corrugation or otherwise configured material, the various layers being sealed to form the final panel structure. Various materials are used in these constructions to insure strength, durability and weather resistance. Blandy shows bonding at the crest of the corrugated medium. Finger is the single patent disclosing the use of woven jute or similar material embedded in a plastic base of thermosetting polyester resin. However, this Finger use of jute is conventional in that it is used largely for visually decorative purposes.

A principal discouragement to the use of jute in a commercial product is its fibrous character which absorbs an extraordinary amount of the expensive polyester resin component.

SUMMARY OF THE INVENTION

According to the present invention, the jute fibers are double-sheared and calendered after weaving, so as to reduce the fibrous surface exposed to the resin and, thereby, alter dramatically the absorptive character of the fibers. The inner or base skin of the building panel, for example, may be comprised of four such woven jute fiber layers saturated in polyester resin, the outer skin may include a single woven jute layer and chopped glass fibers blown with resin onto the exterior layer. An intervening corrugated layer may include three such woven jute layers and be bonded at its curvate extremities and sides to both the inner and outer skin. The resultant panel is inexpensive, lightweight, highly durable in weather and wind resistance. These characteristics enhance use of the panel in construction.

BRIEF DESCRIPTION OF THE DRAWINGS

FIG. 10 is a fragmentary cross section of a modified modular panel used in modular construction;

FIG. 11 is a fragmentary perspective of the type of 22 × 22 mesh woven jute which may be used according to the present invention;

FIGS. 12–16 are schematic showings of channel joints used in attaching and finishing the modular panels 10' as follows:

FIG. 12: capping for doors and window apertures and for doors and windows;

FIG. 13: joiner for two modular panel wall sections;

FIG. 14: attachment to panel base for foundation webbing and including slots (not illustrated) in the horizontal flange for securement of the webbing;

FIG. 15: attachment of wall panel to roof panel; and

FIG. 16: attachment for adjoining wall panels and a central dividing partition.

DESCRIPTION OF THE PREFERRED EMBODIMENTS

Figure 1:
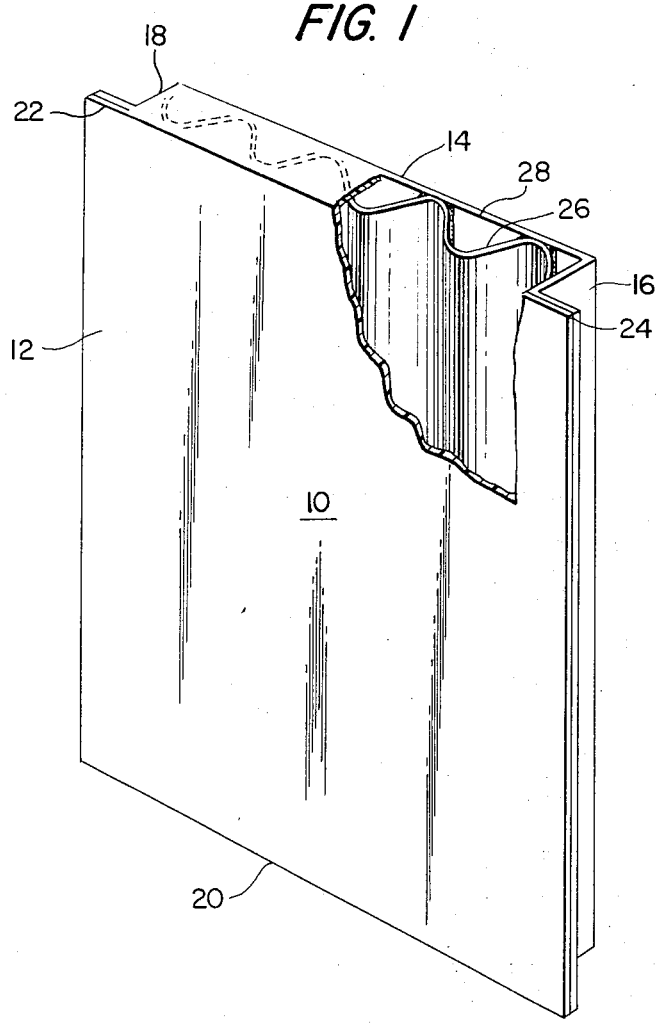
FIG. 1 is a fragmentary perspective of the reinforced and insulating panel, showing the outer skin in the foreground, the corrugated layer interposed between the outer skin and a base or inner skin.

In FIG. 1 the insulating and reinforced building panel 10 of the type used in construction is shown as comprised of outer skin 12 and inner skin 14. Outer skin 12 may have laterally extending flanges 22 and 24 which may be used in joining the panels. Tabs 16 extend perpendicularly from the inner skin 14 to engage the outer skin flanges top, bottom and sides. The corrugated layer 26 is shown as interposed between inner and outer skins, so as to form insulation chambers, and to provide longitudinal and transverse rigidity to the panel.

Figure 2:
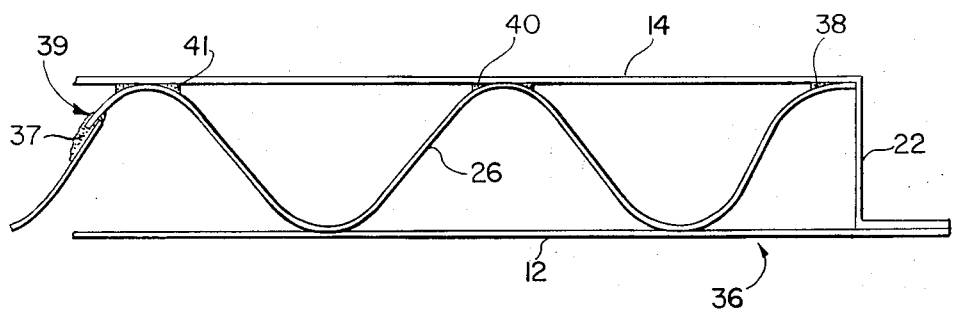
FIG. 2 is a fragmentary vertical section thereof.

In FIG. 2 the mode of bonding of the corrugated layer to the inner and outer skins is particularly illustrated. A polyester bonded joint is provided at 38 in the perpendicular flange 22, as well as cemented at 40 and 41 adjacent each inner curvate extremity of the corrugations. After stretching taut of the woven jute layer 74 (FIG. 9) of outer skin 12 over the corrugated layer 26, the panel is positioned upright and saturated with resin such that the outer skin is bonded to the corrugated layer outer extremities. No additional cementing is necessary.

At the overlap 39, as well as at inner joints (not illustrated) and corners, an additional layer 37 of chopped fiber glass and resin is used as a stiffener.

In the modular-type panel 10' illustrated in FIG. 10, inner skin 14' corrugated layer 26' are similarly joined by polyester cement as at 40' and 41' and a similar chopped fiber glass reinforced polyester flanged joint 37' is provided at the overlay. The woven jute layer of the outer skin 12 saturated with polyester joins the inner skin 14 which extends perpendicularly as tab 91. sides and bottom 93 of inner skin 14'.

Figure 7:
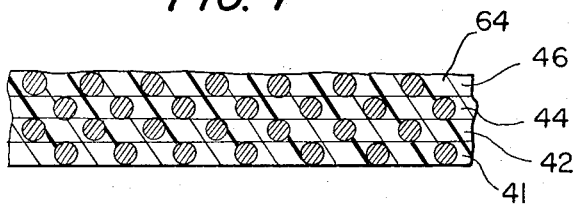
FIG. 7 is a fragmentary and magnified cross section showing four woven jute layers in the inner skin.
Figure 8:
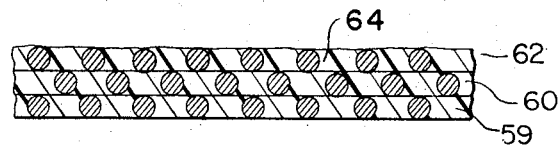
FIG. 8 is a magnified fragmentary cross section, showing the three woven jute layers in the corrugated layer.
Figure 9:
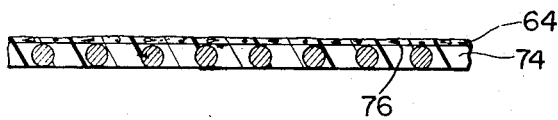
FIG. 9 is a magnified fragmentary cross section showing the juxtaposition of a single woven jute layer with chopped glass fibers on exterior layer.

The make-up of the individual inner, outer and corrugated components is illustrated particularly in FIGS. 7, 8 and 9, as follows:

FIG. 7: Inner skin — four layers of woven jute 22 × 22 mesh 41, 42, 44 and 46 are saturated with polyester resin 64, having a filler such as calcium carbonate;

FIG. 8: Corrugated layer — three layers of woven jute 22 × 22 mesh 59, 60 and 62 saturated with a polyester resin 64, also filled;

FIG. 9: Outer skin — a single layer 74 of woven jute 22 × 22, saturated with a filled resin, covered with a 1/10 inch layer 76 of chopped glass fiber filaments which reinforce a filled polyester 64.

Figure 3:
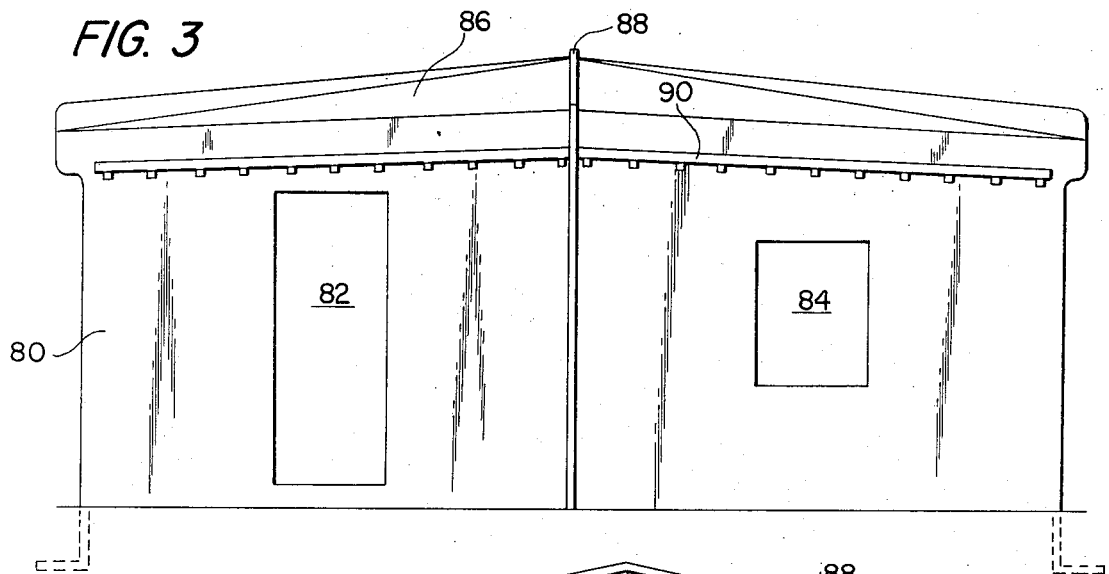
FIG. 3 is a front elevation of a proposed monocoque construction.
Figure 4:
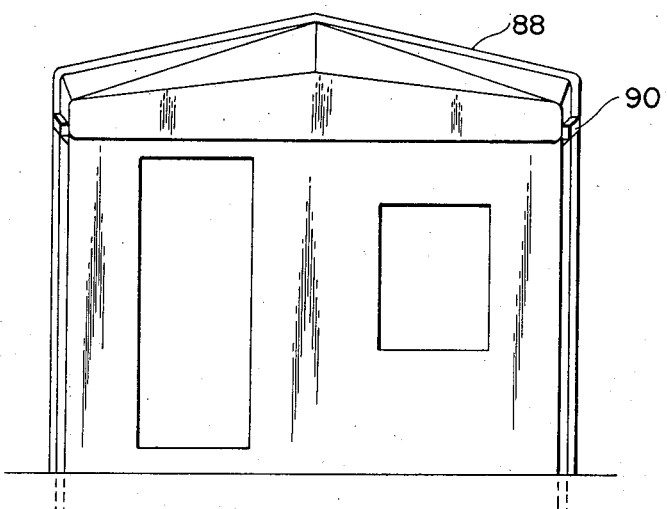
FIG. 4 is a side elevation thereof.
Figure 5:
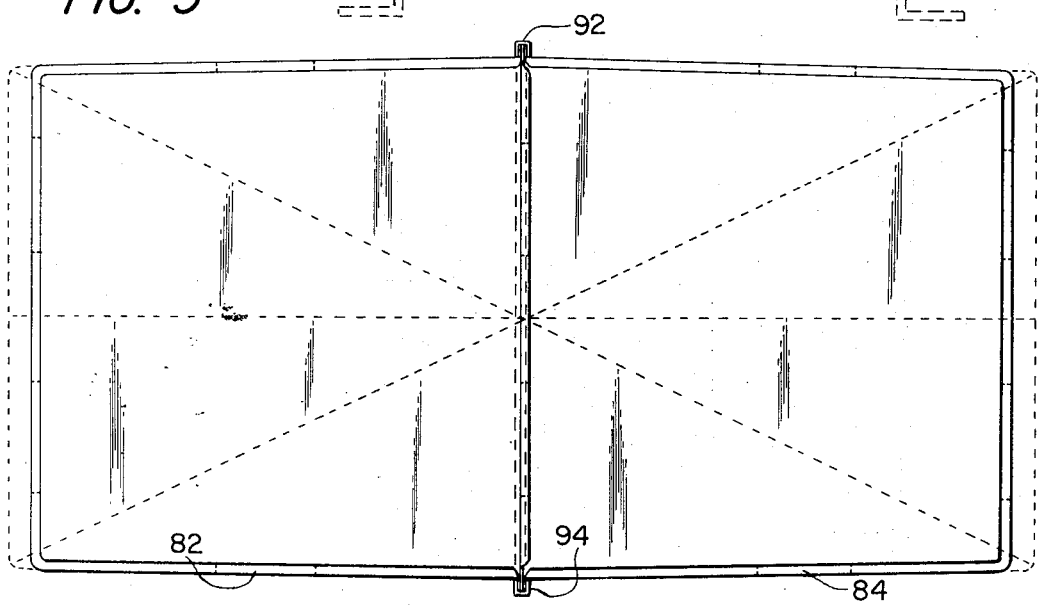
FIG. 5 is a top plan, showing the central flange joint of the monocoque.
Figure 6:
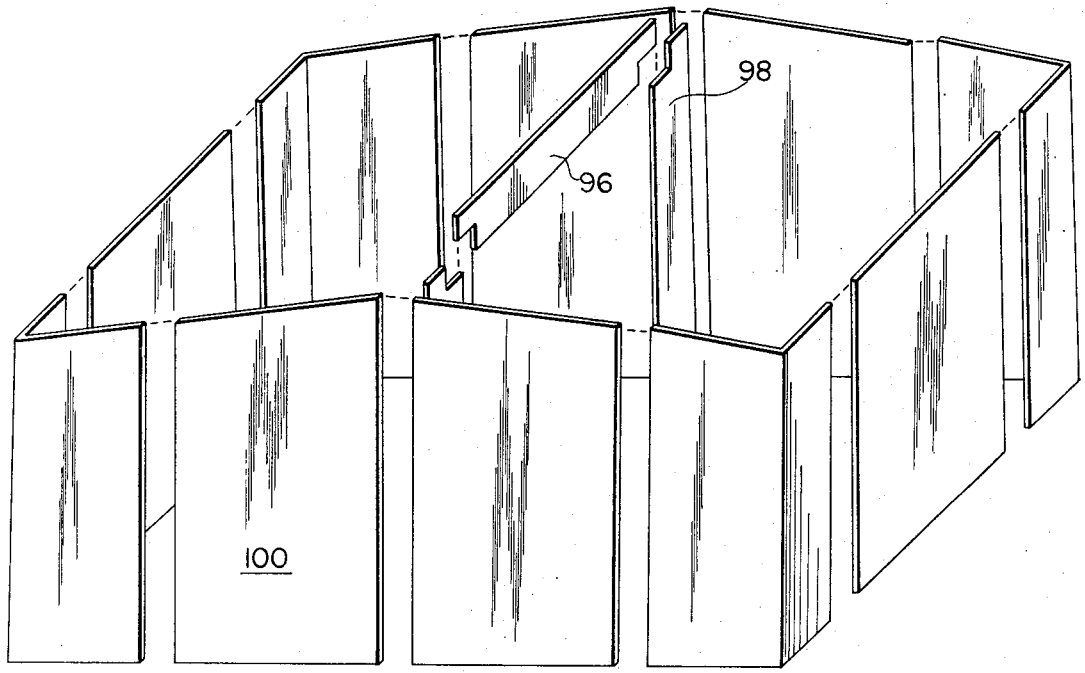
FIG. 6 is an exploded view showing use of the reinforced and insulating building panel in a modular construction using joining channels, the doors and windows being cut out subsequently to assembly.

In FIGS. 3–5, the Bangladesh monocoque structure 80 embodying door elements 82, window elements 84, and inclined roof elements may be cut subsequently to forming the structure.

A panel constructed according to the present invention has been incorporated into such a Bangladesh monocoque as follows:

| | |
|---|---|
| House dimensions | Inside area: 10'×20'<br>Height: 7½' to 9'<br>Foundation: 18" below grade with 90° angle flange extending 12" at base |
| Door and Window Apertures | Inside frames, doors: 28"×76"<br>Inside frames, windows: 28"×40"<br>Framed door aperture (size of actual door): 24"×72"<br>Framed window aperture (size of actual window): 24"×36"<br>Total number of doors (1 interior, 2 exterior): 3<br>Total number of windows: 4 |
| Surface area of House | 835 square feet of actual surface area. Window and door apertures have been subtracted. |
| Bottom Flange | 12" peripheral extension at right angles from base of structure (18" below grade) |
| RAW MATERIALS | |
| Jute | 22×22 mesh double sheared and calendered "Bangalon" jute as furnished by White Lamb Finlay Inc. or equivalent. |
| Polyester Resins | Reichhold Chemicals, Inc.'s "Polylite" No.33-158 (94-158) — a self extinguishing unsaturated polyester resin or equivalent. |
| Polyester Filler-Stiffeners | 20% by weight calcium carbonate filler in the polyester resin. Final choice: Whitaker, Clark & Daniels, Inc.'s "Atomite" 319 |
| Catalysts | Approximately 2% by weight of 60% Methyl Ethyl Ketone Peroxide (MEKP) diluted in dimethyl phthalate solution (with a total equal amount of ethyl acetate carrier and used in spray up apparatus)<br>In the cements, the MEKP was used full strength 2% by weight (without the ethyl acetate). |
| Polyester Cements for Corrugation to Skins | Formulation<br>50% Reichhold Chemicals, Inc's "Polylite" 31-830 (Flexible)<br>50% Reichhold Chemicals, Inc.'s "Polylite" 94-158 (Rigid) |
| *-Continued* | Approximately 1 lb per gallon of "Cab-o-sil" M-5 manufactured by The Cabot Co., Cambridge, Massachusetts — or enough to create desired viscosity; catalyzed by at least 2% by weight MEKP. |
| Construction Stiffeners | Bamboo (in monocoque construction only). Glass fiber reinforced polyester. |
| Surface Finish for Cementing Corrugations to Skins | Created by in-mold form treatment using nylon "peel-ply" layers. |
| Foundation Webbing | Woven polypropylene tapes, approximately 2¼" wide, 450 lb. strength. |
| SKINS | |
| Interior Skin | 4 layers of jute saturated with filled polyester resin. |
| Exterior Skin | 1 layer of jute saturated with filled polyester resin.<br>1 layer of 1/10" chopped glass fibers saturated with filled polyester resin. |
| Final Skin Criterion | 4-3-2 Combination<br>Interior skin: 4 layers of JRP (Jute reinforced polyester)<br>Corrugated layer: 3 layers of JRP<br>Exterior skin: 1 layer JRP; 1 layer FRP (fiber reinforced polyester) |
| Doors and Windows | In the prototype, inexpensive, rough cut lumber was used to simulate rough cut teak wood. In production, however, doors and windows would be manufactured of the same composite as the house walls, thus precluding the cost of wood components. |
| ECONOMICS | It is estimated that a 10'×20' house may be constructed according to the present invention for as little as $300.00. |

As will be apparent, the present method permits the use of jute, as a reinforcing fiber, while avoiding the tendency of the jute to absorb or soak up polyester resin in higher proportions than the ratio of glass fibers to polyesters.

Manifestly, the type of resins, cements and woven jute, as well as the proportions of jute to polyester may be varied without departing from the spirit and subject of invention.

We claim:

1. A reinforced and insulating building panel comprising:

A. an inner skin having a plurality of woven jute layers saturated with an unsaturated polyester resin;

B. an outer skin having a single layer of woven jute fiber saturated with an unsaturated polyester resin and including a chopped glass fiber reinforced polyester resin exterior sprayed upon at least one layer of woven jute saturated with polyester resin; and C. an intermediate corrugated layer, having a plurality of woven jute saturated with polyester resin and resin bonded at its edges and its curvate extremities to said inner and outer skins, said corrugated layer being matte finished at both top and bottom and being cemented at its curvate extremities to said inner skin by special cements and bonded to said woven jute layer in said outer skin by said polyester resin.

2. A reinforced and insulating building panel as in claim 1, wherein said jute fibers are double sheared and calendered after weaving, 22 × 22 mesh and saturated with polyester resin.

3. A reinforced and insulating building panel as in claim 1, said inner skin having four layers of woven jute saturated in said polyester resin.

4. A reinforced and insulating building panel as in claim 3, said corrugated layer having three woven jute layers saturated in said polyester resin.

5. A reinforced and insulating building panel as in claim 1, said polyester resin in said inner and outer skins and said corrugated layer including approximately 20 percent by weight of calcium carbonate filler.

6. A reinforced and insulating building panel as in claim 5, wherein said corrugated layer is matte-finished by the use of nylon "peel-ply" which is applied to both sides of said layer in the mold and subsequently peeled off, prior to cementing to said inner skin.

* * * * *